United States Patent [19]

Chasek

[11] 4,320,400
[45] Mar. 16, 1982

[54] METHOD AND APPARATUS THAT NEARLY INSTANTANEOUSLY SAMPLES, PROCESSES AND SORTS RECEIVED SIGNALS FROM VERY LARGE NUMBERS OF RADAR AND RADIO EMITTERS FOR FREQUENCY AND ANGLE OF ARRIVAL ANALYSIS

[76] Inventor: Norman E. Chasek, 24 Briar Brae Rd., Stamford, Conn. 06903

[21] Appl. No.: 84,410

[22] Filed: Oct. 12, 1979

[51] Int. Cl.³ .............................................. H04B 7/00
[52] U.S. Cl. .......................... 343/100 CL; 343/113 R
[58] Field of Search ......... 343/112 C, 113 R, 100 CL

[56] References Cited

U.S. PATENT DOCUMENTS 4,236,159 11/1980 Alpers .............................. 343/113 R Primary Examiner—Theodore M. Blum
Attorney, Agent, or Firm—Parmelee, Johnson, Bollinger & Bramblett

[57] ABSTRACT

A method and apparatus is described that processes, samples and sorts, for subsequent analysis, very large numbers of randomly arriving pulsed and continuous wave radio and radar signals, while providing essentially 100% probability of intercepting all signals present at any moment. Such characteristics as angle of arrival, signal strength and frequency can be determined from the processed received signal samples. The method uses a rapidly swept frequency window, of specified width and shape, which separates into varying time positions, RF samples of each received signal, said time positions varying as a function of signal frequency. These time varying samples are then processed and separated into three video pulse outputs for frequency, signal strength and angle of arrival determining computations, respectively. The video pulses are again sampled by a step-swept time window with the resulting samples commutated into pulse streams that, with computational processes, result in the desired signal parameter indications. The illustrative embodiment uses several series tunnel diode amplifiers to normalize signal sample amplitudes and to provide logarithmic received signal strength information. Normalized, triangle shaped samples are formed and interpolated to indicate frequency. Phase comparative angle of arrival indications are generated and with available amplitude comparison data eliminates ambiguities typical of the phase data.

9 Claims, 7 Drawing Figures

STEPPED TIMING PULSES

METHOD AND APPARATUS THAT NEARLY INSTANTANEOUSLY SAMPLES, PROCESSES AND SORTS RECEIVED SIGNALS FROM VERY LARGE NUMBERS OF RADAR AND RADIO EMITTERS FOR FREQUENCY AND ANGLE OF ARRIVAL ANALYSIS

BACKGROUND OF THE INVENTION

The analysis of randomly occurring signals received in an environment containing large numbers of pulsed and continuous wave signals, particularly where many of these signals can occur simultaneously, and where no signals should be missed, would normally require a great deal of complex and expensive electronic equipment. For example, if pulsed signals of 0.1 microsecond duration are not to be missed and if these signals can occur anywhere in frequency over a 2 GHZ wide band, with the equivalent of 16 bits of total data required from each signal, the data processing rate can run as high as 10 billion bits per second. Equipment capable of processing data at such rates would be prohibitively expensive for many applications.

When several signal parameters such as frequency, angle of arrival, signal strength, pulse width, etc. are all to be determined from a very large number of randomly arriving signals that should be intercepted with nearly a 100% probability, several problems emerge. How is simultaneous arrival of several signals together handled? How do all the parameters for a single signal get collected for a signal that might exist for a microsecond? How can one measurement be kept from interfering from the others that are simultaneously occurring? And how can such complex analysis be handled with a reasonable amount of complexity?

Accepted approaches that attempt to provide such capability include frequency swept methods, which have probability of intercept problems, and channelized filters which become prohibitively large and expensive. High resolution, high probability of intercept angle of arrival measurements with reasonably sized antennas are only possible with some form of phase comparative measurement, yet practical phase comparative angle of arrival measurements impose difficult phase tracking requirements, particularly as a function of signal level fluctuation and also produce inherent ambiguities. The ability to use the same equipment for frequency and angle of arrival measurements is advantageous. Time sharing of equipment is similarly advantageous. When simultaneously arriving signals are bunched closely in frequency and level, mutual interference will occur negating such measurements. A receiver must respond intelligently to such conditions.

Although frequency is an important characteristic to be measured, in most cases it is not the absolute frequency accuracy but the frequency resolution or discrimination that is important. Also angle of arrival data from each signal becomes more useful as its precision and resolution is increased.

SUMMARY OF THE INVENTION

This invention describes a method and apparatus that receives and simultaneously and instantaneously processes and sorts characterizing samples taken from very large numbers of randomly occurring signals to determine their frequency, angle of arrival, signal strength and pulse width. A rapidly swept frequency window, of specified width and shape, samples arriving signals, producing approximately rectangularly shaped samples of these signals. These samples are normalized in amplitude and then given a triangle-like shape. Simultaneously samples, whose amplitude is logarithmically related to each received signal level, are generated. The start of each sweep cycle is marked by narrow marking pulses which are incrementally delayed and fed out through taps into groupings of sample and hold gates. Each incrementally delayed marking pulse opens all the gates in the group permitting the voltages that represent specific signal characteristics, to be sampled and held until collected by a slower commutating switch. Each commutating switch feeds its data stream into an analogue to digital converter and then into a memory where the numerical representations are stored and mathematically manipulated by microprocessors into the desired signal characteristics.

This rapidly swept window is realized by a swept local oscillator and mixer up-converter. The sweep rate is sufficiently rapid to cover the entire band being surveyed in a time less than that of the duration of the narrowest pulsed signals expected. A filter, following conversion, has a bandwidth that equals $\sqrt{F/\tau}$ where F is the band being surveyed and $\tau$ the narrowest pulse width to be intercepted. This filter's shape is approximately $\sin x/x$ and it is followed by four series tunnel diode amplifier stages which hard limit the received signal. A second filter, square law detector and video amplifier shape the signal samples into the triangle like pulses.

The local oscillator sweep waveform is differentiated and narrow marking pulses are generated to mark the cycle start time. These marking pulses are fed into a tapped delay element, each tap feeding into the referenced group of sample and hold gates. The commutating switch allows time sharing of the analogue to digital converters. The memory collects signal samples for subsequent processing in microprocessors.

Signal level information is generated by a detection process occurring in the tunnel diodes themselves as they are driven, by large signals, into non-linear amplification. Phase comparison signal samples are developed at the RF output of the limiting amplifier for angle of arrival indications.

In order to generate high resolution angle of arrival data, amplitude and phase comparative information received by an array of directional antennas is required. The amplitude comparative angle of arrival information is derived by receiving and measuring the amplitude of the same signal received on two overlapping directional antennas. This information eliminates the ambiguities inherent to phase comparative indications when the antennas are separated by distances greater than a half wavelength. Frequency indications of each sample are also necessary to correct for the frequency sensitive factors inherent to phase comparative angle of arrival computations.

Flexibility in frequency resolution capability is illustrated, with minimum circuitry, by using a feed-back switch that closes around the tapped delay element, allowing recirculating loops to occur. For some applications, every nth delay tap is used and sweep rates and filter bandwidths are reduced by n when the feedback switch is closed for n loops, thereby increasing the frequency resolution by n. A pulse width measurement is illustrated, in which consecutive numbers of sweep cycles, that contain finite signal samples, are counted. This count represents pulse width.

The various aspects and advantages of this invention will be more fully understood from a consideration of the following detailed description in conjunction with the accompanying drawings.

DETAILED DESCRIPTION OF EMBODIMENTS OF THE INVENTION

Figure 1:
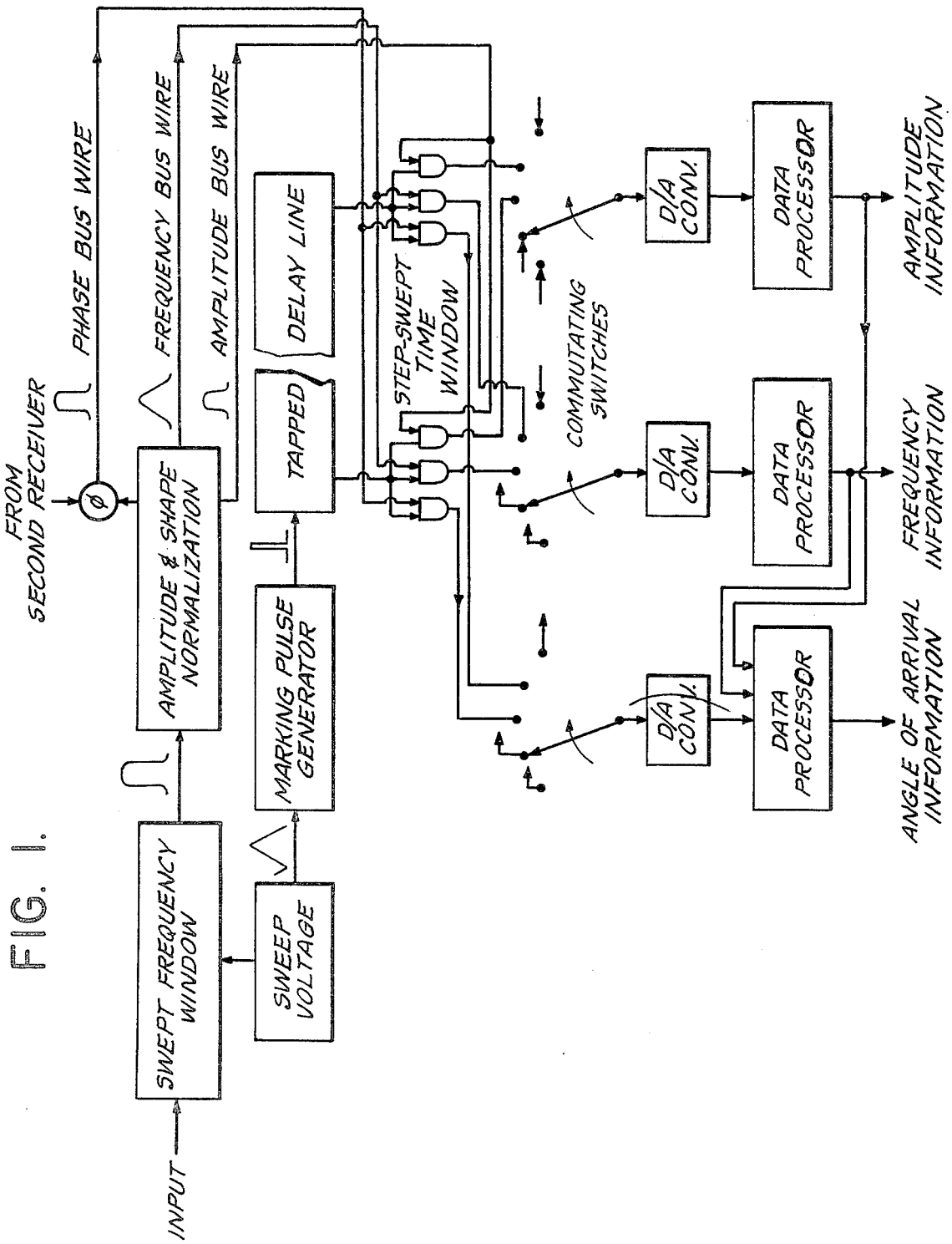
FIG. 1 is a self descriptive block diagram that summarizes the essential ingredients of the invention.

FIG. 1 is a functional block diagram describing how this invention processes received signals prior to analysis. Received signals are first sampled by a very rapidly swept frequency window, 1. Each sample is then normalized in both amplitude and shape in signal processor, 2. Processor 2 provides up to three separately processed video outputs, one representing frequency, using triangularly shaped pulses; a second representing phase differences, after a comparison with counterpart samples in a separate but equivalent receiver, the phase differences being converted into amplitude changes; and a third representing received signal strength, i.e. amplitude, with a logarithmic varying amplitude representation. These samples are sampled by a step-swept time window which sorts the video samples onto separate bus lines, depending on the closest nominal frequency increment in which each falls. The resulting samples can then be analyzed by either analogue or digital methods. For the purpose of this illustrative embodiment digital methods are used.

Each sample is held at the output of time window 3 until it is read by commutating switch 4, which collects a now slowed data stream feeding into digital to analogue D/A converter, 5. Separate commutators and D/A converters are used for each parameter measured. (A fully implemented system would use nine commutator-D/A converter sets.) The data bytes are read into data processor 5 which performs the required computations. Some of these computations will require a great deal of time. Longer hold times in the sampling process, a random access memory read out that skips reading out empty memory elements and the use of more microprocessor elements all contribute to making available more computer time. For example, a fast scan of the amplitude sample memory bank, a parameter needing little, if any, computation time, can be used to control the random access memory read out.

Figure 2:
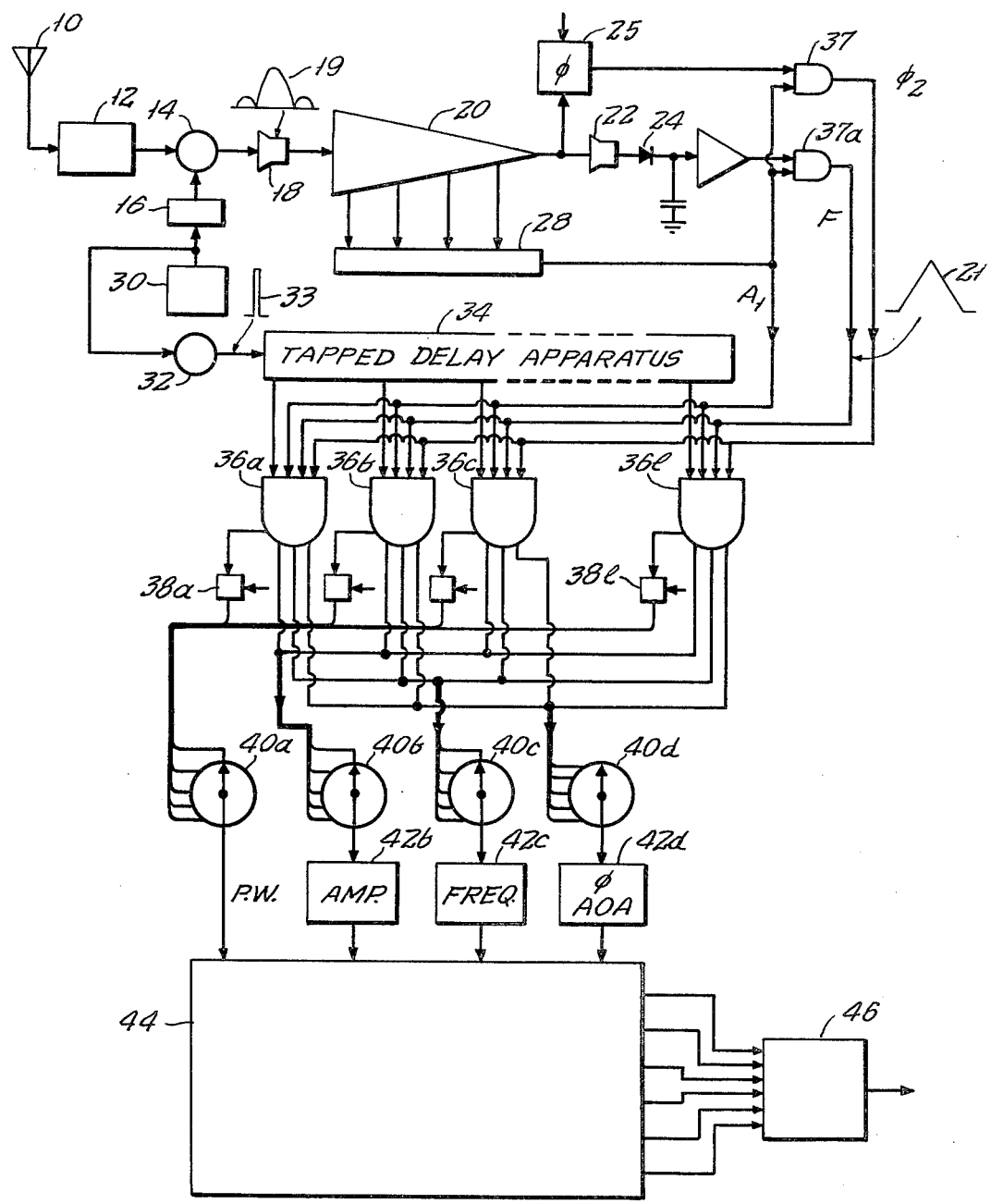
FIG. 2 is a detailed block diagram of an illustrative receiver processor.

An illustrative receiving system that incorporates this method is described in FIG. 2. It includes antenna, 10, and optional first converter, 12, which feeds signals into mixer, 14, which, for this example, functions as an up converter, shifting first converter output frequency band 2–4 GHZ, up to 8–10 GHZ. A rapidly swept local oscillator, 16, sweeps through the surveyed band, $\Delta F$, at a rate, $\tau$, which insures 100% probability of intercept. For example, if the shortest pulses expected are 0.1 microseconds wide, then $\tau$ should be less than 0.1 microseconds. Filter 18 has a bandwidth, $\Delta f$, that is prescribed by $\Delta f \cong \sqrt{\Delta F/\tau}$ Filter 18 is designed so that the swept pulse envelopes that it produces, whenever signals are present, are displaced in time as a function of each signal's frequency. The resulting pulse envelope should preferably have very steep rise times to minimize pulse shape variations as a function of signal strength. Filter characteristic 19 accomplishes this. This pulse sample is fed into limiter amplifier, 20, where amplitude variations are eliminated. The sample then feeds into filter, 22, which in conjunction with square law detector, 24, and amplifier, 26, produces triangle-like pulses that are generally fixed in amplitude and shape regardless of the received signal level or the signal type unless two signals occur simultaneously on adjacent frequencies. In this example a tap is provided at the output of limiter amplifier, 20, to feed hybrid circuit, 25, which provides phase difference information in the form of voltage amplitudes when the signal phase is compared with the same signal's phase received by a displaced antenna. The output of filter, 22, feeds into square law detector, 24, and amplifier, 26. This output signal is used for frequency and pulse width determinations. Signal amplitude monitor, 28, produces a voltage output whose magnitude instantaneously tracks the amplitude of received signals. These three voltages are then conducted by bus wires to assigned gates in gate groups 36a through 1. The signals on the amplitude bus wire, A, are, in this example, used to open series gates 37 and 37a in the frequency and phase bus wires, thus acting to squelch these lines when the received signal amplitude is too low. Each gate, in groups a through 1, has a control port, all of which connect together and tie each gate to the assigned tap on tapped delay section 34.

Simultaneously with the above described steps, a sweep voltage is generated in generator, 30, which sweeps local oscillator, 16. The sweep voltage is differentiated and shaped by processor, 32, generating a narrow output pulse, i.e., 2 nano-seconds wide, coincident with each discontinuity in the sweep wave form. This pulse feeds into tapped delay section, 34, which produces incrementally delayed replicas of the input pulse at each output tap.

Figure 3:
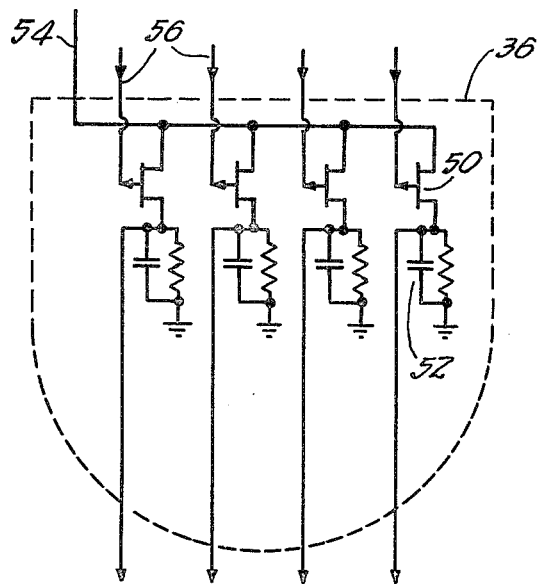
FIG. 3 illustrates details of a group of sample and hold coincidence gates.

FIG. 3 illustrates some details in the design of each gate group, 36. A GaAs field effect transistor (FET), 50, is used as the gating device because of its speed. The collectors of all the GaAs FETs in the cluster are connected together at terminal, 54, which is attached to a delay section tap. The FET gate terminal forms a second input port, 56, which connects to specified bus wires as shown. The FET drain is grounded through a paralleled resistor-capacitor, 52, which provides a hold capability at the gates output. In a fully implemented system, as described by FIG. 7, nine gates are used in each group. Each gate, associated with a specific parameter, connects to commutators 40a through d which periodically removes the stored voltage samples forming them into data streams which feed analogue to digital (A/D) converters, 42a through d. Each A/D converter feeds a memory bank in memory, 44.

The raw data stored in memory, 44, is processed in data processor, 46, to generate the various signal parameters.

Figure 4:
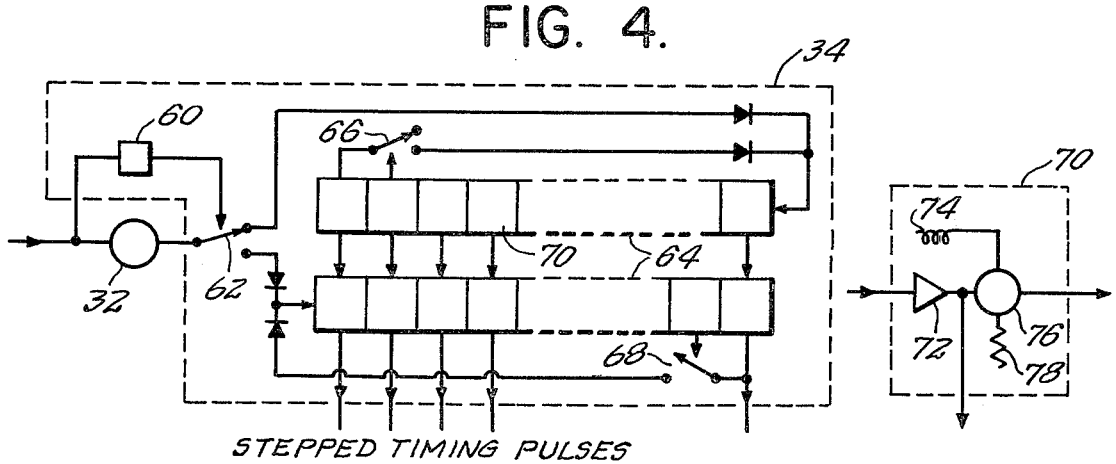
FIG. 4 illustrates details of one realization of the tapped delay line including provision for using a triangular sweep wave and recirculating marking pulses for improved resolution.
Figure 5:
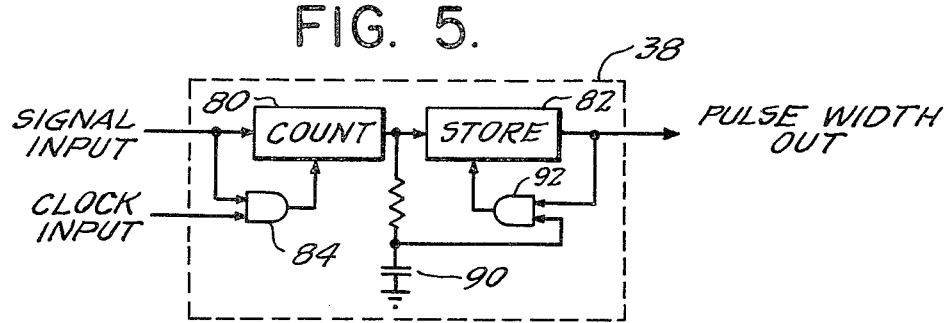
FIG. 5 illustrates details of a pulse width indication circuit.
Figure 6:
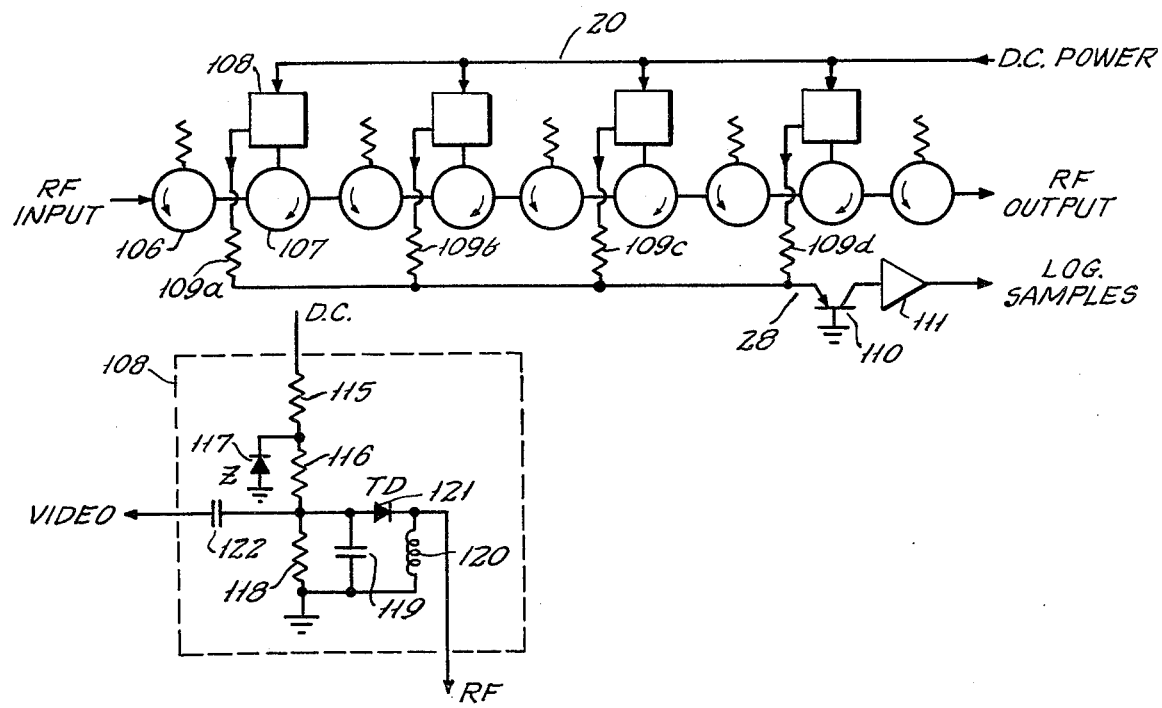
FIG. 6 illustrates one realization of the limiter amplifier as a multi-stage tunnel diode amplifier with an integrated signal level indication circuit.

In order to better understand the illustrative implementation, reference is made to FIGS. 4, 5 and 6.

FIG. 4 illustrates one version of tapped delay section 34. The input pulse width and the delay between taps are an ingredient in defining frequency resolution. In its simplest form, tapped delay section, 34, could be a simple tapped delay line. This, however, would have to be driven by a saw tooth sweep wave. Due to the sweep speeds required, a triangular sweep waveform has advantages, however, such a waveform would require switching between alternate inverted delay sections to provide the same delay for the same frequency on both the up and down sweep legs.

To provide adjustable resolution and keep hardware to a minimum, a pulse can be recirculated through the delay section several times. FIG. 4 illustrates how both objectives can be achieved. Generator, 32, forms pulses of desired width at the sweep discontinuities. Differentiator, 60, produces a square wave from a triangular wave which alternately actuates switch 62 directing the pulse into a tapped delay section 64a or 64b depending on the sweep direction. Switches 66 or 68 are closed when recirculation is desired. The switch closure is long enough to provide for n recirculations, for example. If this recirculation is initiated for improved resolution, then the sweep speed would also be slowed by a factor of n, every nth tap of the delay section would be sampled by the commutator and the filter bandwidth would be reduced by n. Each delay section, 70, in the illustrative design would include a frequency compensated emplifier, 72, and a bifilar wound hydrid, 76, in which one port is resistively terminated by resistor, 78, and the second port terminated by a twisted wire transmission line, 74, left open circuited and sufficiently long to provide a one way delay half that specified for the delay section. Amplifier, 72, compensates for the loss in the transmission line and the hybrid.

FIG. 5 illustrates the details of pulse width indicator 38, which is derived from one sampling gate in gate group 36. The outputs of pulse width indicator 38 feeds directly to commutator, 40, as shown in FIG. 2. Counter, 80, receives pulses from its associated gate in group 36. Nand gate, 84, is actuated by pulses fed directly from one tap of the tapped delay section, 34, and from one output from a gate in group 36a. When a pulse and finite sample voltage are present coincidently, the output pulses generated are counted until the sample voltage is zero for a sweep cycle. At this time counter 80 is read out, its count fed into storage element, 82, and counter 80 is cleared. Output of storage element 82 is read out upon commutator switch contact. If nand gate 92 is open, as is the case when no data is being read into it, this condition is indicated by the voltage across capacitor, 90 being zero. The number read out of storage element 82 is an indicator of the signal's pulse width. The pulse repetition rate could be indicated by the time duration between these read outs.

FIG. 6 illustrates an implementation of limiter amplifier 20 and signal amplitude logarithmic indicator 28. An essential ingredient of the limiter amplifier is that it compress a wide dynamic range of input signals into a very narrow output range and accomplish this with little delay variation as a function of signal strength. For phase comparative direction finding, it is desireable that the phase shift remain relatively fixed as a function of signal level. It is also desireable that logarithmic signal level information be derived with minimal changes in delay. A multistage tunnel diode amplifier satisfies all of these requirements. A four stage amplifier will retain a constant output for a variation in input of nearly 60 db. The phase shift over this wide change in signal input level would be of the order of 5° with essentially no delay changes. As the tunnel diode is over driven with signal, it will act as a detector with delays less than 1 nanosecond. Each tunnel diode amplifier stage consists of ferrite circulators 106 and 107. Circulator, 106, is resistively terminated and acts as an isolator section. Circulator, 107, is terminated by a tunnel diode module, 108. This circuit is repeated four times in a four stage amplifier. Module, 108, contains a bias circuit comprising resistors 115, 116 and zener diode 117, stabilizing resistor 118, bypass capacitor 119, tunnel diode 121 and RF tuning inductor, 120. DC blocking capacitor, 122, feeds the detected signal out into the logarithmic summing transistor 110 through series resistors 109 which are adjusted to provide a suitable voltage characteristic. Amplifier, 111, with clamping circuit completes the amplitude indicating circuit. A typical time constant for resistor 118 and capacitor 119 is $10^{-9}$ or less.

Figure 7:
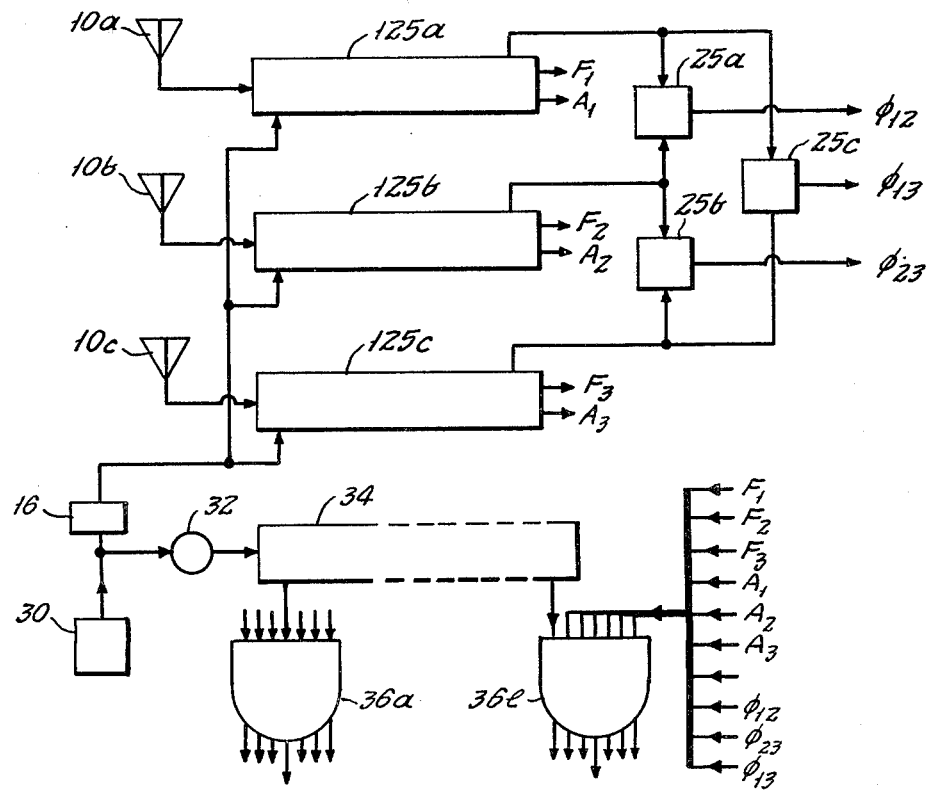
FIG. 7 illustrates the block diagram of the amplitude and phase comparative angle of arrival bus wire signal generation.

FIG. 7 illustrates an angle of arrival receiver configuration showing three receivers 125a, b, and c, each similar to the receiver described by FIG. 2. Each receiver is attached to its own antenna. A common local oscillator, 16, sweep circuit, 30 and tapped delay section, 34, are employed. Three microwave hybrids 25a, b, and c that include oppositely poled detector diodes, indicate phase differences of signals received by the three antennas by the amplitude of the detected voltage. Three amplitude $A_1$, $A_2$, $A_3$, three frequency $F_1$, $F_2$, $F_3$ indicating and three phase $\phi_{12}$, $\phi_{13}$, $\phi_{23}$ bus wires are shown. All nine bus wires terminate at specified gates in each gate group 36a-1. The angle of arrival for each signal sample can be computed by comparing the relative amplitude of each signal sample received by adjacent antennas in an array with the apriori knowledge of the antenna's directional characteristics. Since frequency information is available for each sample, second order corrections can be calculated for the antenna's frequency sensitive characteristic.

Angle of arrival information can be obtained with greater precision and resolution by comparing the relative phase of the signal samples received in phase matched receivers. However, if the antennas in the array are separated by more than a half wavelength, ambiguities result. These can be eliminated by the unambiguous, but coarse, directional information available by comparing relative signal amplitudes from the overlapping directional antennas. Phase comparative measurements are also sensitive to frequency. Apriori correction equations, which used available frequency information, eliminates the frequency sensitive factors by microprocessor computation.

If antennas 10a, b and c have overlapping directional patterns, the phase, amplitude and frequency bus wires will carry all the information necessary for a microprocessor to calculate precise angles of arrival of all received signal samples, except where simultaneous signals occur at adjacent frequencies. These calculations are based on known trigonometric relationships. The frequency resolution and frequency measurement accuracy inherent to this method improves with improved linearity and frequency stability of the swept local oscillator, by minimizing delay variations, and by jointly reducing the sweep rate and filter bandwidths and increasing the delay between successive taps. The triangular shaped pulses, produced by filter, 22, detector, 24, and amplifier, 26, makes significant frequency interpolation possible in memory, 44, to further improve frequency discrimination. The interpolation process requires that the triangular pulse be two delay increments wide at its base. The frequency interpolation between two adjacent time slots is then represented by the following mathmatical relationship.

$$F = \frac{F_1 + F_2}{2} + \frac{(F_2 - F_1)}{2}(A_2 - A_1)$$

This interpolation process assumes that $A_1 + A_2 = 1$. If $A_1 + A_2 < 1$, the interpolation data from the next adjacent pair of memory lines should be used. If $A_1 + A_2 > 1$, then two or more signals are simultaneously present within the limits of resolution of the system and all calculations based on these numbers will be in error.

$F_1$ is the nominal frequency assigned to the center of the first delay increment and $F_2$ is the frequency of the second delay increment.

I claim:

1. A receiving system capable of processing signals received from a very large number of radar and radio emitters so as to provide simultaneous indications from which such signal parameters as frequency, angle of arrival, signal strength and/or pulse width can be determined, is comprised of,
    a multiplicity of directional antennas with suitably overlapping radiation patterns,
    a multiplicity of matched receiver converters, including a rapidly swept frequency window that samples all signals received by said antennas,
    a multiplicity of matched RF signal processors that compresses said samples to have a nearly constant output amplitude, with minimal phase shift as a function of signal input amplitude, and to also generate logarithmic signal strength indicating samples from said signals,
    a multiplicity of matched video processors that convert said RF samples into video samples that are useful for frequency and angle of arrival indications,
    a multiplicity of step-swept time windows which further samples and holds all said video samples, separating them onto individual bus lines, depending on each sample's time position in the frequency sweep cycle, and
    a multiplicity of commutating switches, one commutating switch being assigned for each parameter being indicated.

2. Same as claimed in claim 1 except that in receiving systems used only for frequency, signal strength and pulse width indications, a single antenna and single set of associated receiving apparatus is used.

3. Same as claimed in claim 1 but including,
    a second signal processor that generates phase difference indicating signals from RF samples taken from antenna pairs by means of hybrid circuits and detectors that produce video pulses whose amplitude is related to said phase differences, and said phase differences, in conjunction with known trigonometric relationships, makes computation of angle of arrival, is subsequent data processing equipment, possible.

4. A method for removing ambiguities from phase comparative angle of arrival indications, in which the angle of arrival is first estimated from logarithmic signal strength amplitude comparisons of each signal received by overlapping antenna and receiver matched pairs, as claimed in claim 1, and said estimates are used in computations to eliminate the ambiguity errors generated in phase comparative measurements.

5. A method for generating frequency information from frequency swept, hard limited signal samples, comprises the steps of,
    shaping the swept frequency samples prior to hard limiting so that the resulting samples approximate rectangular pulses and following the hard limiter,
    shaping the said samples by means of a second filter, so that it, in conjunction with square low detection, produces triangular like pulses whose width, along the baseline, is twice the input pulse width and whose peak amplitude is a nominal 1,
    sampling and holding said triangular pulses, by means of a step-swept time window,
    determining where two or more consecutive step-swept time slots contain sampled signals of said triangular pulses, each said slot representing an incrementally differing nominal frequency,
    summing the magnitudes of said consecutive triangular pulse samples and determining if said sum is equal to, greater than or less than said nominal amplitude of 1, and if said sum equals 1, more or less, then mathematically taking half the difference between said triangular pulse amplitude samples and multiplying said difference by the incremental frequency difference between said adjacent nominal frequencies, represented by each time slot, and adding the resulting product to the mean frequency between said two nominal frequencies, and if said sum is less than 1,
    skipping over that frequency computation as being meaningless, and if said sum is greater than 1,
    voiding all computations based on both said samples.

6. A method for forming and sorting swept signal samples taken from a large number of randomly occurring radio and radar signals for the purpose of determining the angle of arrival, frequency, signal strength and pulse width of each signal present, comprises the steps of,
    sweeping a frequency window of specified width and shape over an entire frequency band being surveyed, at a rate sufficiently fast to insure a high probability of intercepting samples of all signals present at any moment,
    processing said signal samples into logarithmically indicating sample's of each received signal's strength,
    normalizing both the magnitude and envelope shape of each sample to be of fixed, nearly triangular shape, independent of the signal's original form and magnitude, for the purpose of frequency indication,
    comparing the RF phase of each sample with equivalent samples from adjacent processors for the purpose of angle of arrival indications,
    marking the start of each said periodic frequency window sweep with a narrow marking pulse,
    sequentially delaying said marking pulse by incremental amounts by means of a tapped delay line apparatus,
    applying said incrementally delayed marking pulses to one port of a group of sample and hold gates, feeding sampled voltages, indicative of specific signal parameters, to a second port of each said gate, in each said grouping, so that the time coincidence of said marking pulse with any specific parameters sample allows the step-swept time window to instantaneously sample and hold momentary levels until sampled level is removed by a commutating switch assigned to each signal parameter to be indicated, forming all pulse samples into pulse data streams so that data pulses for a given signal sample appear in the same parallel time slots due to synchronization of frequency and time sweeps with commutator switch, and encoding data pulses into data bytes which represent each pulses magnitude.

7. Apparatus for sampling and sorting receiving signals from large numbers of radio and radar emitters for the purpose of determining each signal's angle of arrival, frequency, received level and pulse width, is comprised of, a swept local oscillator and mixture which converts all received signals to a second frequency where approximately rectangular shaped samples are generated by the pre-selection filter, a limiter amplifier that compresses the wide range of input levels received into a constant output level, the limiter amplifier being free of delay shifts as a function of signal level, a logarithmic signal strength indicator which samples the level of each received signal at each stage of the limiter amplifier and sums said samples together to provide logarithmic signal strength information on a bus wire, phase comparative hybrid circuits, with oppositely poled detector diodes, that receive the RF signal samples from the output of said limiter amplifier, and generate pulsed voltage levels whose amplitude is related to the phase difference of each signal sample appearing simultaneously in matched, paired receivers, a filter, square law detector and amplifier that receives signals from said limiter amplifier, said filter-detector-amplifier converting said swept samples into triangle-like shaped pulses, for frequency indication purposes, a differentiator and pulse forming circuit which generates the narrow marking pulses from the sweep voltage used to sweep said local oscillator, a tapped delay section connected to said pulse forming circuit, whose taps connect to control ports of sample and hold gates in a group of gates, bus wires that feed sampled voltages, indirectly representative of amplitude, phase and frequency, to the remaining port of each said sample and hold gate, commutator switches, assigned to each said bus wire, remove said sampled and held magnitudes from each gate output, analogue to digital (A/D) converters, connected to the "rotor" arm of each said commutator switch, convert removed sample amplitudes into data bytes, and digital memories which store the data bytes from said A/D converters.

8. A limiting amplifier, as claimed in claim 7 that is comprised of between three and five series tunnel diode amplifier stages.

9. Apparatus for compressing a wide dynamic range of input signals into a narrow output range with insignificant delay variation as a function of signal strength comprising:

a multi-stage tunnel diode amplifier;

each amplifier stage including two ferrite circulator sections, a first of said ferrite circulator sections being resistively terminated for acting as an isolator section, a second of said ferrite circulator sections being terminated in a tunnel diode amplifier module having an output coupling capacitor, a resistor in series with the output coupling capacitor from each tunnel diode amplifier module, and a voltage summing circuit having its input connected to the opposite side of each resistor from the coupling capacitor of the respective tunnel diode amplifier module, said voltage summing circuit including a transistor feeding into an amplifier having a clamping circuit and a d.c. output.

* * * * *